(12) United States Patent
Diard et al.

(10) Patent No.: US 7,773,090 B1
(45) Date of Patent: Aug. 10, 2010

(54) KERNEL MODE GRAPHICS DRIVER FOR DUAL-CORE COMPUTER SYSTEM

(75) Inventors: Franck R. Diard, Mountain View, CA (US); Jim Keller, Berkeley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1021 days.

(21) Appl. No.: 11/423,928

(22) Filed: Jun. 13, 2006

(51) Int. Cl.
*G06T 1/00* (2006.01)
*G06T 15/00* (2006.01)
*G06F 15/00* (2006.01)

(52) U.S. Cl. ........................... 345/522; 345/501
(58) Field of Classification Search ............ 719/321, 719/322, 323; 345/501
See application file for complete search history.

(56) References Cited

U.S. PATENT DOCUMENTS

2003/0140179 A1* 7/2003 Wilt et al. ............... 709/321
2005/0044319 A1* 2/2005 Olukotun ................. 711/118
2005/0223199 A1* 10/2005 Grochowski et al. ........ 712/235
2007/0204268 A1* 8/2007 Drepper .................. 718/102
2007/0283138 A1* 12/2007 Miga et al. ................. 713/2

* cited by examiner

*Primary Examiner*—Kee M Tung
*Assistant Examiner*—Jacinta Crawford
(74) *Attorney, Agent, or Firm*—Townsend and Townsend and Crew LLP (57) ABSTRACT

A kernel-mode graphics driver (e.g., a D3D driver running under Microsoft Windows) exploits the parallelism available in a dual-core computer system. When an application thread invokes the kernel-mode graphics driver, the driver creates a second ("auxiliary") thread and binds the application thread to a first one of the processing cores. The auxiliary thread, which generates instructions to the graphics hardware, is bound to a second processing core. The application thread transmits each graphics-driver command to the auxiliary thread, which executes the command. The application thread and auxiliary thread can execute synchronously or asynchronously.

20 Claims, 8 Drawing Sheets

```
       ClearEvent(AuxDone);
503—   write(cmd, SharedMemory);
504—   SetEvent(AuxWakeUp);
505—   WaitForEvent(AuxDone);
```

```
     loop {
              WaitForEvent(AuxWakeUp);   —512
              read(cmd, SharedMemory)    —513
511           process(cmd);              —514
              ClearEvent(AuxWakeUp);     —515
              SetEvent(AuxDone);         —516
     }        // end loop
```

KERNEL MODE GRAPHICS DRIVER FOR DUAL-CORE COMPUTER SYSTEM

BACKGROUND OF THE INVENTION

The present invention relates in general to graphics drivers and in particular to a kernel-mode graphics driver (such as a D3D driver) optimized for use in a dual-core computer system.

A graphics driver is a software component of a computer system that provides an interface allowing application and/or operating system programs to access functionality of a graphics processor or other graphics hardware without knowing low-level details of the hardware. A graphics driver typically implements a library of functions that can be called by application programs (if the driver runs in user mode) or operating system programs (if the driver runs in kernel mode); in the latter case, the operating system provides an interface layer between the application and the graphics driver.

Figure 1:
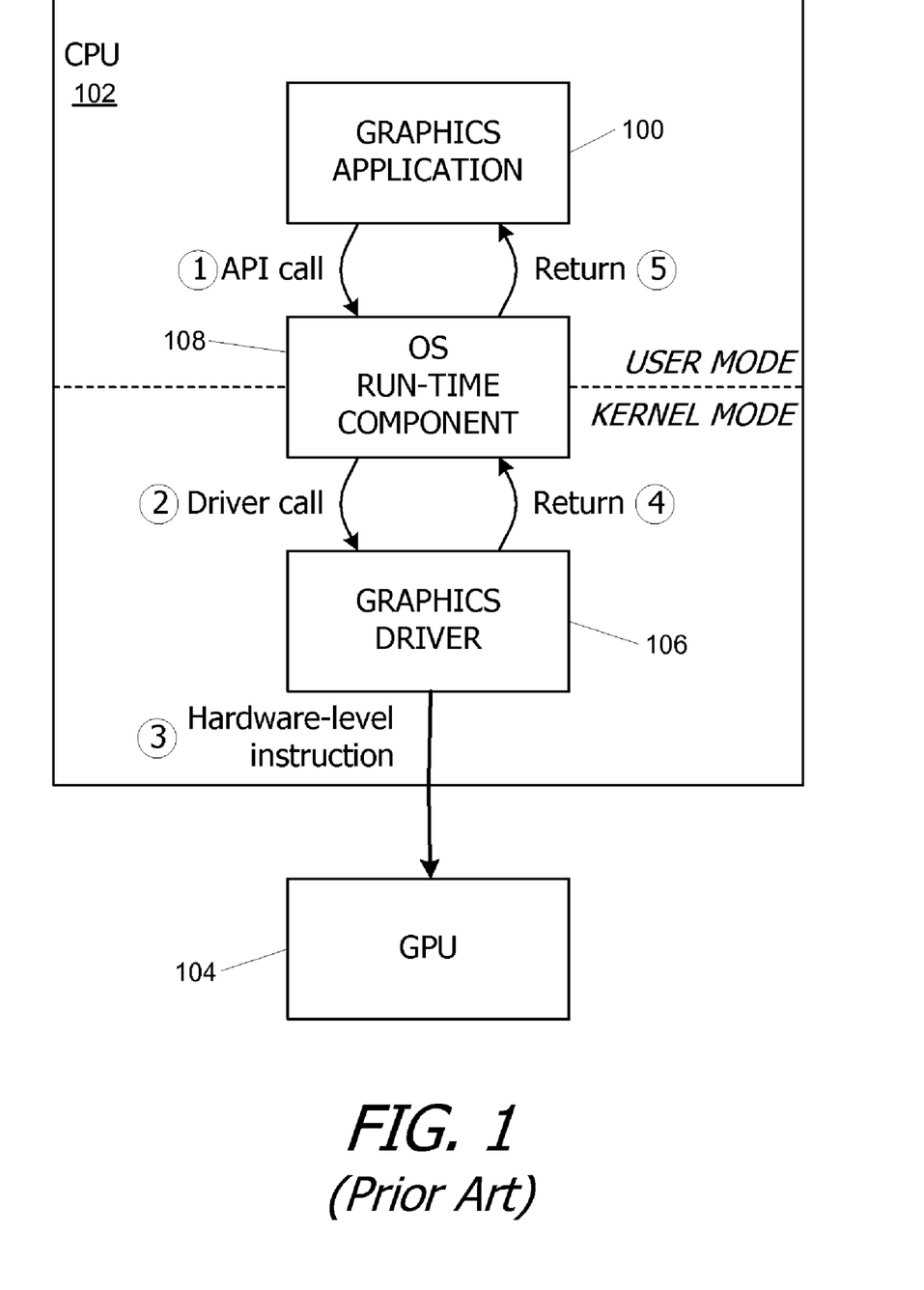
FIG. 1 illustrates control flow during execution of a conventional graphics application using a kernel-mode graphics driver.

FIG. 1 illustrates the execution of a conventional graphics application under the Microsoft Windows® operating system, using a kernel-mode graphics driver such as the D3D component of the Direct X® multimedia driver specified by Microsoft Corporation. In FIG. 1, a graphics application 100 executes on a central processing unit (CPU) 102. The application executes in user mode, meaning the application can directly access only a subset of system functions. As is known in the art, restricting applications' access to system functions helps to prevents applications from initiating operations that lead to system crashes or other undesirable results.

A graphics processing unit (GPU) 104 operates as a slave to CPU 102 to perform various graphics-related tasks, such as image rendering and/or display. GPU 104 is programmable using an instruction set that may be unique to a particular graphics device or family of graphics devices.

To allow application developers to use GPU 104 without knowing the details of its instruction set, a graphics driver program 106 is generally provided together with GPU 104. Graphics driver 106, which executes on CPU 102, receives a predefined, hardware-independent set of driver calls and generates corresponding instructions to the hardware. Various standard graphics-driver interfaces have been defined, such as Microsoft's D3D interface; each such interface includes a library of functions that graphics driver 106 recognizes and responds to by generations appropriate hardware-level instructions to GPU 104. A D3D graphics driver executes in a "kernel mode," which allows unrestricted access to system functionality.

Graphics application 100, because it executes in user mode, is not permitted to invoke kernel-mode graphics driver 106 directly. Instead, the operating system (OS) includes a run-time component 108 that provides an interface between user-mode graphics application 100 and kernel-mode graphics driver 106. Specifically, run-time component 108 implements an application program interface (API) that provides a library of graphics function calls that application 100 can use to invoke functions of graphics driver 106. Run-time component 108 translates the API calls into graphics driver calls recognized by driver 106. One such API is a part of Microsoft's D3D specification.

During a graphics operation using D3D, the sequence of calls numbered 1-5 in FIG. 1 typically occurs. First, graphics application 100 makes an API call (1) to OS run-time component 108. The API call identifies an operation, such as setting a drawing color or drawing a primitive, that the graphics hardware is to perform. The API call transfers control from graphics application 100 to OS run-time component 108, and graphics application 100 waits for a response from run-time component 108 before proceeding further. Run-time component 108 validates the call (e.g., making sure that the call is appropriate given the current state of the system), then makes a corresponding call (2) to graphics driver 106 and waits for a response. Graphics driver 106, in response to call (2), transmits one or more hardware-level instructions (3) to GPU 104 for execution. After transmitting these instructions, graphics driver 106 returns control (4) to OS run-time component 108, which in turn returns control (5) to graphics application 100, which can then proceed. In some cases, when run-time component 108 returns control to graphics application 100, the return message may include an error or status code, which application 100 can use to determine a subsequent action. This error or status code can originate from graphics driver 106 or OS run-time component 108. Thus, the various operations performed by application program 100, run-time component 108, and graphics driver 106 are generally part of a single thread of execution in CPU 102.

Recently, personal computer systems with two or more processing cores have reached the marketplace. Such systems, referred to herein as "dual-core" systems, may include two (or more) cores in a single integrated circuit device, or chip, that functions as the system CPU, or they may include two (or more) processor chips that co-operate as a single CPU. Dual-core systems allow two (or more) processing tasks to be performed simultaneously using separate resources; the resulting parallelism can increase system performance.

However, even in dual-core systems, processing tasks associated with the same thread of execution, such as the various tasks associated with FIG. 1, must be executed sequentially to preserve system coherence. Consequently, conventional graphics application programs, which are single-threaded, do not realize a performance benefit when executing on a dual-core system.

BRIEF SUMMARY OF THE INVENTION

Embodiments of the present invention provide graphics drivers that exploit the parallelism available in dual-core computer systems to improve graphics application performance. In one embodiment, the first time an application thread invokes a kernel-mode graphics driver (such as a D3D driver), the kernel-mode graphics driver creates a second thread (referred to herein as an "auxiliary thread") and binds the application thread to a first one of the processing cores. The auxiliary thread, which generates instructions to the graphics hardware, is bound to a second processing core. Thereafter, the application thread transmits each graphics-driver command invoked by the application to the auxiliary thread, which executes the command. In some embodiments, the application thread and auxiliary thread are synchronous, with the application thread transmitting one command to the auxiliary thread, then waiting for a response from the auxiliary thread before proceeding. In other embodiments, the application thread and the auxiliary thread are asynchronous, and after transmitting a command to the auxiliary thread, the application thread does not wait for a response to the command from the auxiliary thread before proceeding.

According to one aspect of the present invention, a method is provided for operating a kernel mode graphics driver in a processing system having at least a first core and a second core. In a kernel mode segment of an application thread that executes an application program, an auxiliary thread is created for communicating with a graphics device. The application thread binds itself to the first core (e.g., by setting an operating-system-supported affinity mask to an appropriate value). A first graphics command originating from the application program is received, and the first graphics command (e.g., in the form of a tokenized representation) is written to a shared memory accessible to the auxiliary thread. The auxiliary thread binds itself to the second core (e.g., by setting an affinity mask to an appropriate value). The auxiliary thread then reads the first graphics command from the shared memory and transmits a hardware level instruction corresponding to the first graphics command to the graphics device. In some embodiments, after writing the first graphics command to the shared memory, the kernel mode segment of the application thread signals the auxiliary thread to execute the first graphics command, e.g., by setting an operating-system event. The auxiliary thread can be idle while waiting for this signal.

In some embodiments, the application thread and the auxiliary thread execute synchronously. For instance, the auxiliary thread can return a done signal to the application thread after transmitting the hardware level instruction to the graphics device, e.g., by setting an operating-system event. After writing the first graphics command to the shared memory, the kernel mode segment of the application thread waits for the done signal from the auxiliary thread and returns control of the application thread to the application program after receiving the done signal from the auxiliary thread.

In other embodiments, the application thread and the auxiliary thread may execute asynchronously. For instance, after writing the first graphics command to the shared memory, the kernel-mode segment of the application thread may return control of the application thread to the application program without waiting for a response from the auxiliary thread. In some asynchronous embodiments, selective synchronization can be performed. For instance, if the kernel-mode segment of the application thread receives a second graphics command originating from the application program, where the second graphics command requires synchronization with the graphics device, the kernel-mode segment of the application thread may write a synchronization command to the shared memory. The auxiliary thread responds to the synchronization command by returning a done signal to the application thread, and the kernel-mode segment of the application thread waits for the auxiliary thread to return the done signal. In some embodiments, the kernel-mode segment of the application thread may also write the second graphics command to the shared memory such that the auxiliary thread will execute the second graphics command before executing the synchronization command.

In some embodiments, only graphics commands that require instructions to the hardware device are executed in the auxiliary thread. For instance, if the kernel mode segment of the application thread receives a second graphics command that is to be executed without an instruction to the graphics device, the second graphics command may be executed within the kernel mode segment of the application thread. Where the application thread and the auxiliary thread are asynchronous, prior to executing the second graphics command, the kernel mode segment of the application thread may write a synchronization command to the shared memory; the auxiliary thread responds to the synchronization command by sending a done signal to the application thread. The kernel-mode segment of the application thread waits for the auxiliary thread to send the done signal, then executes the second graphics command.

According to another aspect of the present invention, a graphics driver is provided for a computer system having a central processor with at least a first core and a second core. The graphics driver includes application interface logic and auxiliary logic. The application interface logic is adapted to be bound to the first core of the central processor and is also adapted to communicate with an application program via an operating system program. The auxiliary logic is adapted to be bound to the second core of the central processor and is also adapted to communicate with a graphics device. The application interface logic is also adapted to receive graphics commands originating from an application program and to write the graphics commands to a shared memory. The auxiliary logic is also adapted to read the graphics commands from the shared memory and to execute the graphics commands by communicating the corresponding instructions to the graphics device.

In some embodiments, the auxiliary logic is adapted to communicate a done signal to the application interface logic upon completion of executing the graphics commands, and the application interface logic is adapted to wait for the done signal after writing the graphics command to the shared memory.

In other embodiments, the application interface logic is adapted to determine whether the received graphics command is a blocking command (i.e., a command that requires synchronization) and to write a synchronization command to the shared memory in the event that the received graphics command is a blocking command. The auxiliary logic is further adapted to read the synchronization command from the shared memory and, in response thereto, to communicate a done signal to the application interface logic, e.g., by setting an operating-system event register.

According to still another aspect of the present invention, a computer program product includes a computer readable medium encoded with program code for communicating between a central processor having at least a first core and a second core and a graphics device coupled to the central processor. The program code includes program code executable in a kernel mode segment of an application thread running on the central processor and program code executable in an auxiliary thread also running on the central processor. The program code executable in the kernel-mode segment of the application thread includes program code for creating an auxiliary thread for communicating with the graphics device, binding the application thread to the first core of the central processor, receiving a first graphics command originating from the application program, and writing the first graphics command to a shared memory accessible to the auxiliary thread. The program code executable in the auxiliary thread includes program code for binding the auxiliary thread to the second core of the central processor, reading the first graphics command from the shared memory, and transmitting a hardware level instruction corresponding to the first graphics command to the graphics device. Such program code can be executable, e.g., by a central processor running a version of a Microsoft Windows operating system and may also include program code for executing a D3D graphics driver function invoked by the operating system.

The following detailed description together with the accompanying drawings will provide a better understanding of the nature and advantages of the present invention.

DETAILED DESCRIPTION OF THE INVENTION

Embodiments of the present invention provide graphics drivers that exploit the parallelism available in dual-core computer systems to improve graphics application performance. In one embodiment, the first time an application thread invokes a kernel-mode graphics driver (such as a D3D driver), the kernel-mode graphics driver creates a second thread (referred to herein as an "auxiliary thread") and binds the application thread to a first one of the processing cores. The auxiliary thread, which generates instructions to the graphics hardware, is bound to a second processing core. Thereafter, the application thread transmits each graphics-driver command invoked by the application to the auxiliary thread, which executes the command. In some embodiments, the application thread and auxiliary thread are synchronous, with the application thread transmitting one command to the auxiliary thread, then waiting for a response from the auxiliary thread before proceeding. In other embodiments, the application thread and the auxiliary thread are asynchronous, and after transmitting a command to the auxiliary thread, the application thread does not wait for a response to the command from the auxiliary thread before proceeding.

System Overview

Figure 2:
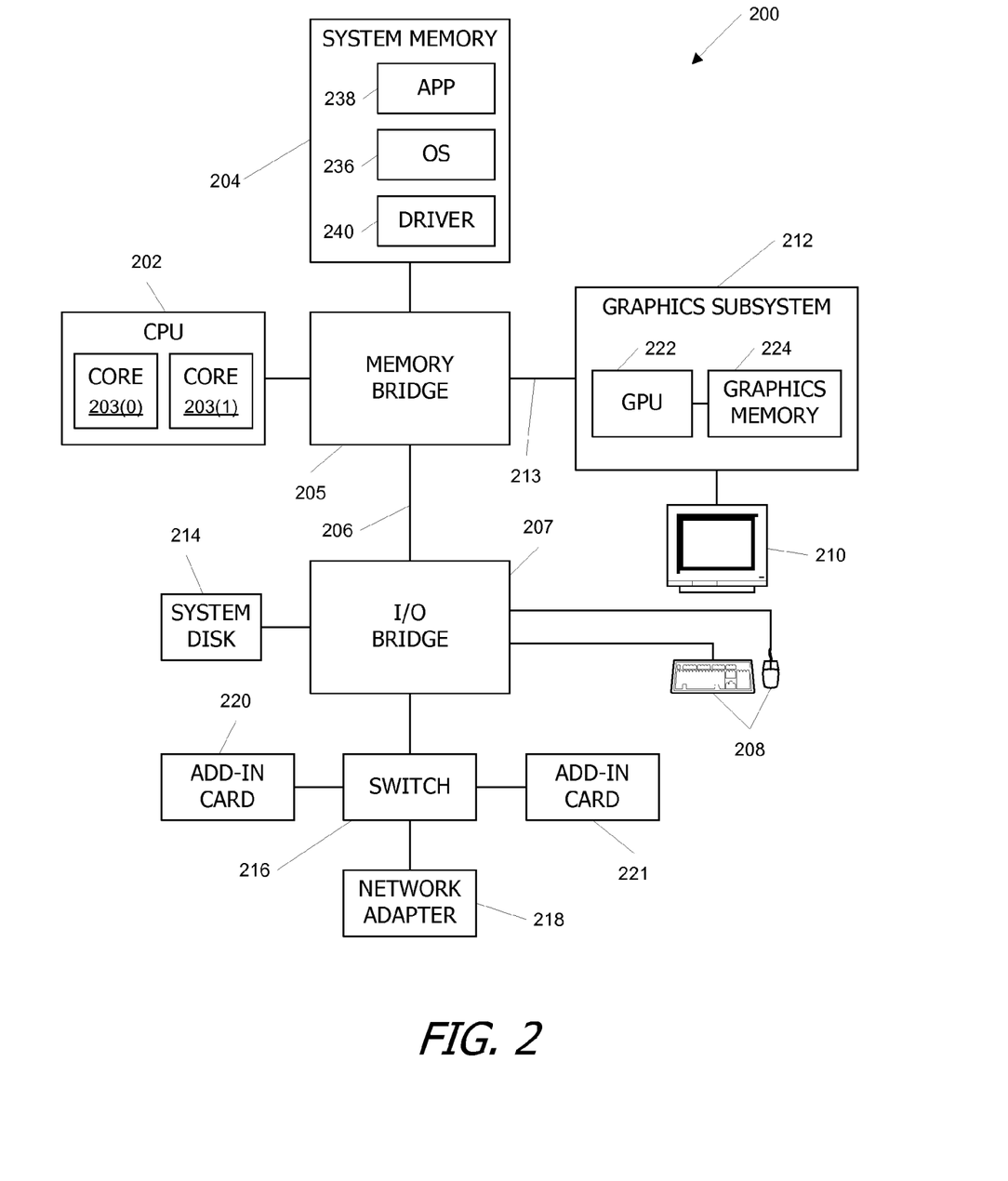
FIG. 2 is a block diagram of a computer system according to an embodiment of the present invention.

FIG. 2 is a block diagram of a computer system 200 according to an embodiment of the present invention. Computer system 200 includes a dual-core central processing unit (CPU) 202 with cores 203(0) and 203(1). CPU 202 communicates with a system memory 204 via a bus path that includes a memory bridge 205. Memory bridge 205, which may be, e.g., a conventional Northbridge chip, is connected via a bus or other communication path 206 (e.g., a HyperTransport link) to an I/O (input/output) bridge 207. I/O bridge 207, which may be, e.g., a conventional Southbridge chip, receives user input from one or more user input devices 208 (e.g., keyboard, mouse) and forwards the input to dual-core CPU 202 via bus 206 and memory bridge 205. Visual output is provided on a pixel based display device 210 (e.g., a conventional CRT or LCD based monitor) operating under control of a graphics subsystem 212 coupled to memory bridge 205 via a bus or other communication path 213, e.g., a PCI Express (PCI-E) or Accelerated Graphics Port (AGP) link. A system disk 214 is also connected to I/O bridge 207. A switch 216 provides connections between I/O bridge 207 and other components such as a network adapter 218 and various add-in cards 220, 221. Other components (not explicitly shown), including USB or other port connections, CD drives, DVD drives, and the like, may also be connected to I/O bridge 207. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 212 includes a graphics processing unit (GPU) 222 and a graphics memory 224, which may be implemented, e.g., using one or more integrated circuit devices such as programmable processors, application specific integrated circuits (ASICs), and memory devices. GPU 222 may be configured to perform various tasks related to generating pixel data from graphics data supplied by CPU 202 and/or system memory 204 via memory bridge 205 and bus 213, interacting with graphics memory 224 to store and update pixel data, and the like. For example, GPU 222 may generate pixel data from 2-D or 3-D scene data provided by various programs executing on CPU 202. GPU 222 may also store pixel data received via memory bridge 205 to graphics memory 224 with or without further processing. GPU 222 may also include a scanout module configured to deliver pixel data from graphics memory 224 to display device 210. It will be appreciated that the particular configuration and functionality of graphics processing subsystem 212 is not critical to the present invention, and a detailed description has been omitted.

CPU 202 operates as the master processor of system 200, controlling and coordinating operations of other system components. During operation of system 200, cores 203(0) and 203(1) of CPU 202 execute various programs that are (temporarily) resident in system memory 204. In one embodiment, these programs include one or more operating system (OS) programs 236, one or more graphics application programs 238, and one or more graphics driver programs 240 for controlling operation of GPU 222. It is to be understood that, although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 214, and/or in other storage space.

Operating system programs 236 and/or graphics application programs 238 may be of conventional design. A graphics application program 238 may be, for instance, a video game program that generates graphics data and invokes appropriate functions of GPU 222 to transform the graphics data to pixel data. Another application program 238 may generate pixel data and provide the pixel data to graphics memory 224 for display by GPU 222. It is to be understood that any number of application programs that generate pixel and/or graphics data may be executing concurrently on CPU 202. Operating system programs 236 (e.g., the Graphical Device Interface (GDI) component of the Microsoft Windows operating system) may also generate pixel and/or graphics data to be processed by GPU 222. In some embodiments, application programs 238 and/or operating system programs 236 may also invoke functions of GPU 222 for general-purpose computation.

Graphics driver program 240 enables communication with graphics subsystem 212, e.g., with GPU 222. Graphics driver program 240 advantageously implements one or more standard kernel-mode driver interfaces such as Microsoft D3D. OS programs 236 advantageously include a run-time component that provides a kernel-mode graphics driver interface via which graphics application program 238 communicates with a kernel-mode graphics driver 240, e.g., as described above with reference to FIG. 1. Thus, by invoking appropriate function calls, operating system programs 236 and/or graphics application programs 238 can instruct graphics driver program 240 to transfer geometry data or pixel data to graphics processing subsystem 212, to control rendering and/or scanout operations of GPU 222, and so on. The specific commands and/or data transmitted to graphics processing subsystem 212 by driver program 240 in response to a function call may vary depending on the implementation of graphics subsystem 212, and driver program 240 may also transmit commands and/or data implementing additional functionality (e.g., special visual effects) not controlled by operating system programs 236 or application programs 238.

It will be appreciated that the system shown herein is illustrative and that variations and modifications are possible. The bus topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, graphics subsystem 212 is connected to I/O bridge 207 rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, switch 216 is eliminated, and network adapter 218 and add-in cards 220, 221 connect directly to I/O bridge 207.

The connection of graphics subsystem 212 to the rest of system 200 may also be varied. In some embodiments, graphics system 212 is implemented as an add-in card that can be inserted into an expansion slot of system 200. In other embodiments, graphics subsystem 212 includes a GPU that is integrated on a single chip with a bus bridge, such as memory bridge 205 or I/O bridge 207. Graphics subsystem 212 may include any amount of dedicated graphics memory, including no dedicated memory, and may use dedicated graphics memory and system memory in any combination. Further, any number of GPUs may be included in graphics subsystem 212, e.g., by including multiple GPUs on a single graphics card or by connecting multiple graphics cards to bus 213.

Graphics Driver Using Synchronized Threads

Figure 3:
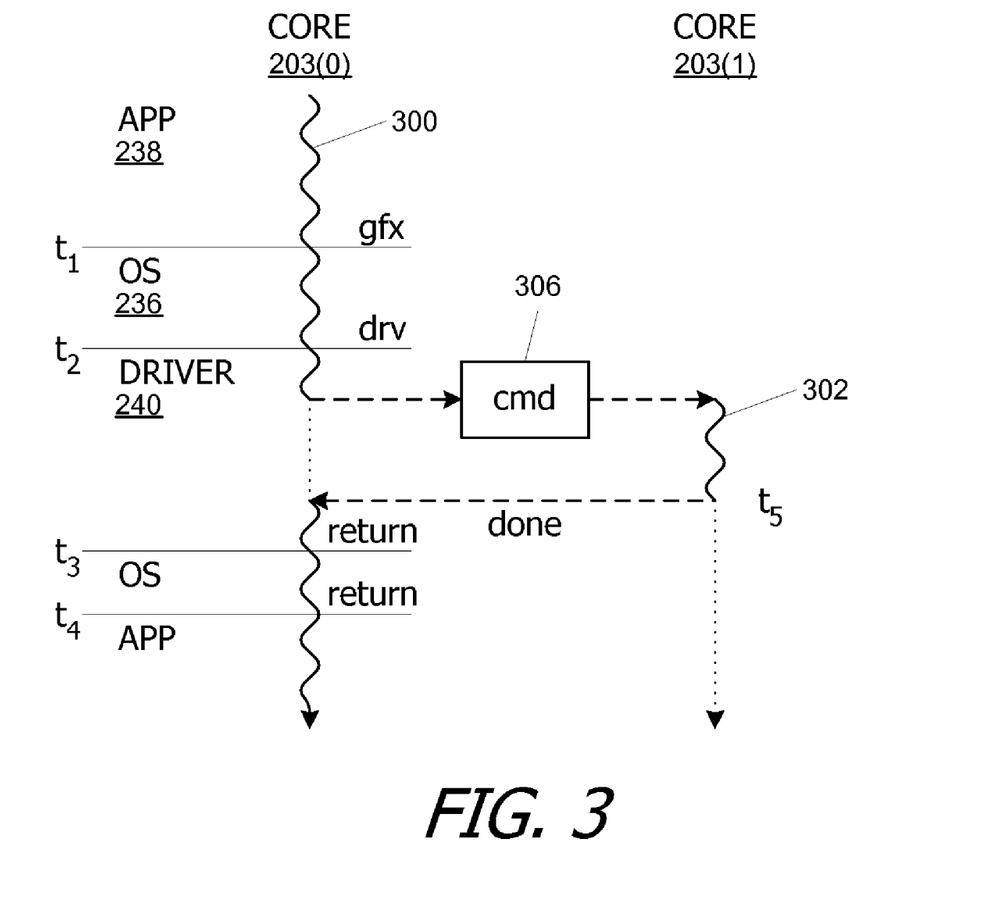
FIG. 3 is a thread timeline view illustrating an operating principle of an embodiment of the present invention in which two synchronous threads execute a graphics driver.

In accordance with an embodiment of the present invention, execution of a graphics application program 238 is advantageously distributed across both cores of dual-core CPU 202 by creating a second thread, referred to herein as an "auxiliary thread," that executes some or all of the kernel-mode graphics-driver instructions included in the program flow of the graphics application. FIG. 3 is a thread timeline view illustrating an operating principle of one embodiment of the present invention. In FIG. 3, time is the vertical axis, and each vertical line represents a thread. A wavy thread line represents an active thread, while a dotted line represents an inactive thread that is waiting to be reactivated.

A graphics application thread 300, executing graphics application program 238, begins execution on one of the cores, e.g., core 203(0), of dual-core CPU 202 of FIG. 2. At time $t_1$, graphics application thread 300 calls a graphics API function ("gfx") calls and control passes to the run-time component of OS 236. OS 236 validates the API call and a calls a corresponding driver function ("drv") of kernel-mode graphics driver 240 at time $t_2$. It should be noted that, up to this point, the sequence of events can be identical to the conventional sequence depicted in FIG. 1; thus, the present invention can be practiced without modifying conventional application and operating-system software.

Kernel-mode graphics driver 240, when first invoked in application thread 300, creates an auxiliary thread 302, which is bound to a different core, e.g., core 203(1), of CPU 202 of FIG. 2. Kernel-mode graphics driver 240 then forwards the received driver command to auxiliary thread 302, e.g., by writing a tokenized representation of the driver command (cmd) to a shared memory 306 that can also be accessed by auxiliary thread 302. While application thread 300 waits, auxiliary thread 302 reads the command from shared memory 306, executes the command, and returns a "done" signal (which may include an error code, status indicator, or other information) at time $t_5$. Upon receiving the done signal from auxiliary thread 302, application thread 300 returns control to OS 236 at time $t_3$, and OS 236 returns control to application program 238 at time $t_4$. Auxiliary thread 302 advantageously does not terminate upon returning the done signal to application thread 300. Instead, auxiliary thread 302 waits in an inactive state until the next graphics call is made, at which point driver 240 writes another command to shared memory 306 and signals CPU 202 to activate auxiliary thread 302.

In this embodiment, threads 300 and 302 execute synchronously, and while one thread is active, the other is generally inactive. This mimics the behavior of the conventional single-thread/single-core process described above with reference to FIG. 1. However, the available pool of resources is expanded by making use of the second core. For instance, each core of CPU 202 generally has its own instruction and data caches; consequently, executing most driver commands on core 203(1) and application commands on core 203(0) prevents data or instructions associated with the driver commands from overwriting data or instructions that application thread 300 may have stored in the caches of core 203(0). Similarly, driver-related data or instructions, once cached in core 203(1) for auxiliary thread 302, are not overwritten by application thread 300. For some graphics applications, the dual-thread configuration of FIG. 3 can provide about a 5% increase in execution speed over the conventional configuration of FIG. 1.

Figure 4A:
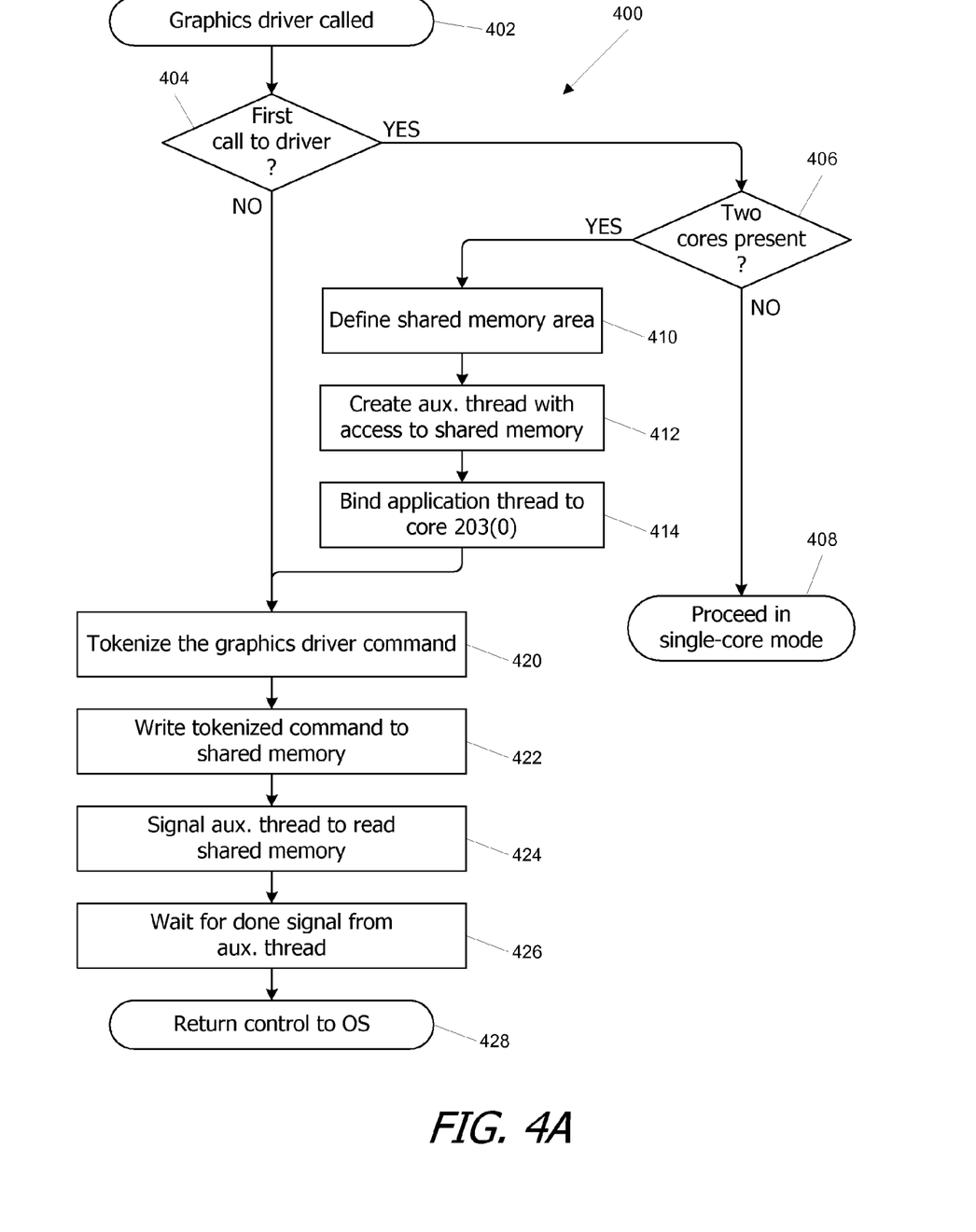
FIGS. 4A and 4B are flow diagrams of a process for executing a graphics command in a kernel-mode graphics driver using two synchronous threads according to an embodiment of the present invention.
Figure 4B:
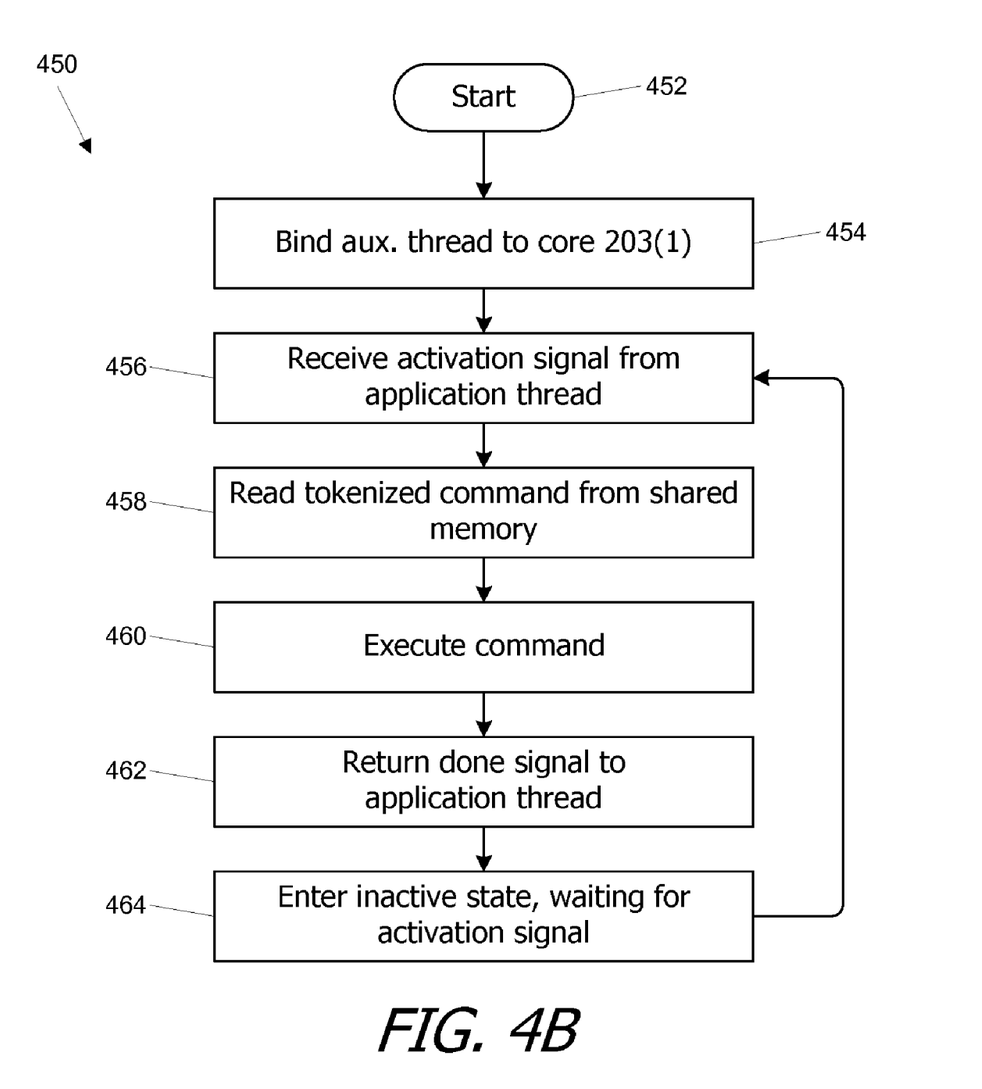

FIGS. 4A and 4B are flow diagrams of a process 400 for executing a graphics command in a kernel-mode graphics driver 240 using two synchronous threads according to an embodiment of the present invention. FIG. 4A shows the process from the perspective of application thread 300 of FIG. 3, while FIG. 4B shows the process from the perspective of auxiliary thread 302 of FIG. 3.

Referring first to FIG. 4A, process 400 starts when application thread 300 calls a function of graphics driver 240 (step 402). It is to be understood that application thread 300 of FIG. 3 may perform any number of operations prior to a call to graphics driver 240; such operations, which may be of a conventional nature, are not described further herein. As described above, application program 238 advantageously invokes kernel-mode graphics driver functions via the run-time component of OS 236.

At step 404, graphics driver 240 determines whether the current graphics driver function call is the first such call in application thread 300. If so, then at step 406, graphics driver 240 accesses system configuration information to determine whether CPU 202 provides two (or more) cores. If CPU 202 has only one core, then graphics driver 240 proceeds in a single-core mode (step 408), which may be implemented in conventional fashion (e.g., as described above with reference to FIG. 1), ending process 400.

If CPU 202 has two (or more) cores, graphics driver 240 creates an auxiliary thread 302. More specifically, at step 410, graphics driver 240 defines a shared memory area 306 for use in delivering commands to the auxiliary thread; conventional operating-system functions for creating a memory area that is sharable between threads can be used. Shared memory area 306 can be of any desired size and is advantageously large enough to store at least one tokenized graphics driver command. At step 412, graphics driver 240 creates the auxiliary thread 302, e.g., using conventional operating-system-defined functions. Auxiliary thread 302 is configured to execute a process 450 described below with reference to FIG. 4B and has access to shared memory area 306.

At step 414, graphics driver 240 binds application thread 300 to core 203(0) of CPU 202. In one embodiment for the Microsoft Windows operating system, a thread can be bound to a core by setting an affinity mask from a within kernel-mode section of the thread. Once a thread sets an affinity mask, the thread remains bound to the core specified by the mask until the thread explicitly changes the mask. Thus, once kernel-mode graphics driver 240 sets an appropriate affinity mask at step 414, application thread 300 remains bound to core 203(0). While core 203(0) is used as an example herein, it should be understood that application thread 300 can be bound to any core of CPU 202 (FIG. 2) as long as auxiliary thread 302 is bound to a different core. (Binding of auxiliary thread 302 is described below.)

The remaining steps of process 400 are performed for all calls to graphics driver 240, including the first call. At step 420, graphics driver 240 tokenizes the received graphics driver command. A particular tokenizing algorithm is not critical to the present invention; any such algorithm, including algorithms known in the art, may be used. At step 422, the tokenized command is written to shared memory 306.

At step 424, graphics driver 240 signals auxiliary thread 304 to read shared memory 306 and process the command, and at step 426, graphics driver 240 waits for auxiliary thread 302 to return the done signal indicating that command execution has finished. In one embodiment, signaling and waiting are performed using operating-system events to synchronize the threads, as described further below.

Eventually, auxiliary thread 302 finishes executing the command and returns control to application thread 300. In some embodiments, auxiliary thread 302 may provide an error code, status indication, or the like to application thread 300 upon completing execution of a command. At step 428, graphics driver 240 returns control to OS 236; step 428 may also include returning an error code, status code or the like (e.g., the same code returned by auxiliary thread 302). At that point, process 400 ends, although application thread 300 can continue to execute. At the next call to a graphics driver function, process 400 executes again.

In some embodiments, auxiliary thread 302 executes only those graphics-driver commands that require writing instructions to graphics subsystem 212. Other graphics-driver commands can be executed from within application thread 300. Accordingly, in some embodiments, process 400 includes an additional decision step (not explicitly shown) at which graphics driver 240 determines whether to forward the received command to auxiliary thread 302, and steps 420, 422, 424, and 426 are performed only for commands that are forwarded. Other commands are executed directly by application thread 300, after which control is returned to OS 236.

FIG. 4B illustrates a process 450 that may be executed in auxiliary thread 302 according to an embodiment of the present invention. Process 450 starts (step 452) when application thread 300 creates auxiliary thread 302, e.g., at step 412 of process 400 of FIG. 4A. Auxiliary thread 302 binds itself to core 203(1) at step 454, e.g., by setting an appropriate affinity mask in a Microsoft Windows-based embodiment. While core 203(1) is used as an example herein, it should be understood that auxiliary thread 302 can be bound to any core of CPU 202 (FIG. 2) as long as application thread 300 is bound to a different core.

At step 456, process 450 receives an activation signal from application thread 300. This signal may be generated, e.g., at step 424 of process 400 of FIG. 4A. After receiving the activation signal, process 450 reads the tokenized command from shared memory 306 (step 458) and executes the command (step 460). Commands may be executed in a conventional manner, which may include, e.g., writing one or more hardware-level instructions to a "push buffer" that is read and processed asynchronously by GPU 222 of FIG. 2 (or by some other component of graphics subsystem 212). Once the appropriate instructions are written to the push buffer, the command is considered executed, and process 450 returns the done signal to application thread 300 at step 462. After returning the done signal, auxiliary thread 302 advantageously enters an inactive state (step 464), waiting for the next activation signal from application thread 300. Receiving the next activation signal returns process 450 to step 456 to process another command.

As noted above, in some embodiments, the exchange of the activation signal and return of control can be managed using operating-system event functionality. Event functionality is a feature of various operating systems, including, e.g., Microsoft Windows operating systems. The operating system manages a number of 1-bit registers, referred to as event registers, that can be accessed through operating-system function calls referred to herein as "SetEvent( )," "ClearEvent( )," and "WaitForEvent( )" each of which takes an argument identifying a particular event register. The SetEvent( ) function sets the bit in the specified event register to a logic high state, indicating that the event has occurred; the ClearEvent( ) function sets the bit to a logic low state, indicating that the event has been acknowledged or is no longer of interest; and the WaitForEvent( ) function signals the operating system's scheduler component that execution of the thread that invoked the WaitForEvent( ) function should be suspended until the bit in the event register has been set to logic high.

In one embodiment, application thread 300 and auxiliary thread 302 are synchronized by using two events, referred to herein as "AuxWakeUp" and "AuxDone." The AuxWakeUp event, which corresponds to the activation signal, is set by application thread 300 to signal auxiliary thread 302 that a command is waiting in shared memory 306 to be processed. The AuxDone event, which corresponds to the done signal, is set by auxiliary thread 302 to signal application thread 300 that processing of the command is finished.

Figure 5A:
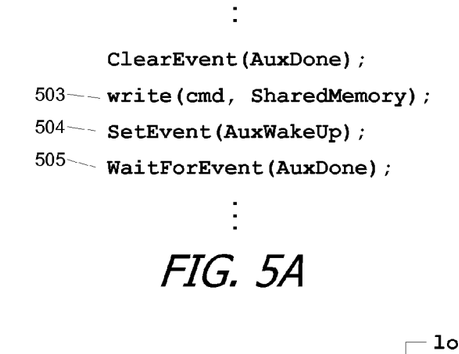
FIGS. 5A and 5B illustrate pseudocode fragments that can be used in an application thread and an auxiliary thread, respectively, to provide synchronization using operating-system events according to an embodiment of the present invention.
Figure 5B:
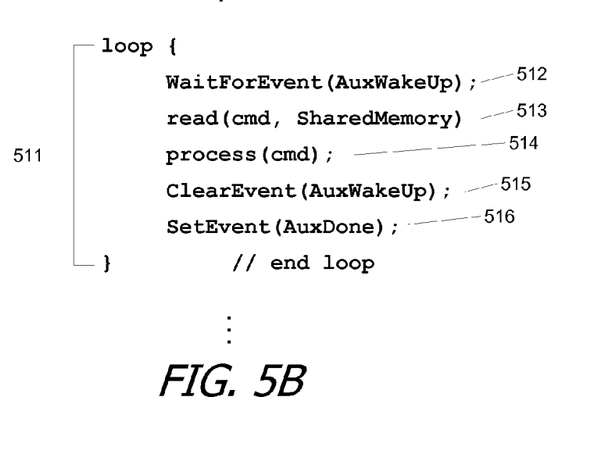

FIGS. 5A and 5B illustrate pseudocode fragments that can be used in application thread 300 and auxiliary thread 302, respectively, to provide synchronization using these OS events. After writing the command to shared memory 306 (line 503 in FIG. 5A), application thread 300 sets the AuxWakeUp event (line 504), which is detected by auxiliary thread 302 (line 512 in FIG. 5B). This event triggers auxiliary thread 302 to perform an iteration of its processing loop (511 in FIG. 5B). After setting the AuxWakeUp event (line 504 in FIG. 5A), application thread 300 waits for the AuxDone event (line 505), which is set by auxiliary thread 302 (line 516 in FIG. 5B) after reading and processing the command (lines 513, 514) and clearing the AuxWakeUp event (line 515).

It is to be understood that the pseudocode in FIGS. 5A and 5B—and the use of operating-system events—for interthread synchronization is optional. In alternative embodiments, polling techniques, semaphores, or the like may also be used to synchronize the threads.

As noted above, in this embodiment, application thread 300 and auxiliary thread 302 remain synchronized, so that at any given time CPU 202 might be executing instructions for one thread or the other but not for both at once. Performance advantages are realized through reduced sharing of resources such as caches that results from distributing the work across two cores.

Graphics Driver Using Asynchronous Threads

Figure 6:
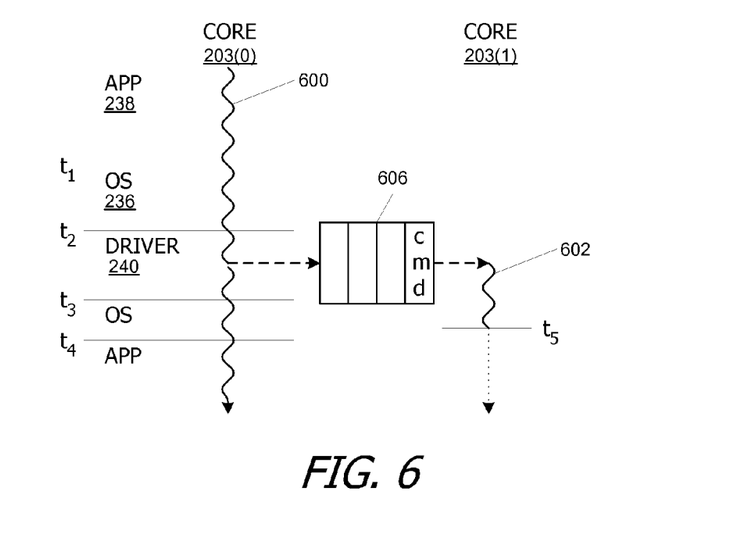
FIG. 6 is a thread timeline view illustrating an operating principle of an embodiment of the present invention in which two asynchronous threads execute a graphics driver.

In some embodiments of the present invention, further performance advantages can be obtained by allowing the application thread and auxiliary thread to operate asynchronously, so that instructions for both threads can be executed at the same time using two different cores of CPU 202. FIG. 6 is a thread timeline view illustrating an operating principle of an embodiment of the present invention in which the application thread and auxiliary thread are asynchronous. In FIG. 6, as in FIG. 3 described above, time is the vertical axis, and each vertical line represents a thread. A wavy thread line represents an active thread, while a dotted line represents an inactive thread that is waiting for an event to reactivate it.

A graphics application thread 600, executing graphics application program 238, begins execution on one of the cores, e.g. core 203(0), of dual-core CPU 202 of FIG. 2. At time $t_1$, graphics application thread 600 calls a graphics API function ("gfx"), and control passes to the run-time component of OS 236. OS 236 validates the API call and calls a corresponding driver function ("drv") of kernel-mode graphics driver 240 at time $t_2$. It should be noted that, up to this point, the sequence of events is identical to the sequence depicted in FIG. 3.

Kernel-mode graphics driver 240, when first invoked in application thread 600, creates an auxiliary thread 602, which is bound to a different core, e.g., core 203(1), of CPU 202. Kernel-mode graphics driver 240 then forwards the received driver command to auxiliary thread 602, e.g., by writing a tokenized representation of the driver command (cmd) to a shared memory 606 that can also be accessed by auxiliary thread 602. Auxiliary thread 602 reads the command from shared memory 606 and executes the command while application thread 600 continues to execute. At time $t_3$, driver program 240 returns control of application thread 600 to OS 236, and at time $t_4$, OS 236 returns control to application program 238, which continues to execute as shown. In parallel, auxiliary thread 602 executes the command; when execution is finished, auxiliary thread 602 enters an inactive state at time $t_5$. Like auxiliary thread 302 of FIG. 3, auxiliary thread 602 advantageously waits in the inactive state until the next graphics call is made, at which point driver 240 writes another command to shared memory 606 and signals CPU 202 to reactivate auxiliary thread 602.

It should be noted that time $t_5$ can be before, between, or after times $t_3$ and $t_4$, in contrast to FIG. 3, in which time $t_5$ is always before time $t_3$. Thus, threads 600 and 602 are asynchronous. In addition, it is possible for application thread 600 to make a second graphics API call before auxiliary thread 602 had finished executing a previous call. To allow application thread 600 to run farther ahead of auxiliary thread 602, shared memory 606 may be implemented as a FIFO or other multi-entry buffer from which auxiliary thread 602 reads commands in the order they were written by application thread 600, allowing application thread 600 to run several commands (up to the size of the buffer) ahead of auxiliary thread 602. If application thread 600 attempts to write a new command to shared memory 606 when no entry is available, application thread 600 is advantageously required to wait at that point until an entry becomes available. Asynchronous execution of application thread 600 and auxiliary thread 602 allows application thread 600 to execute faster than in the synchronous case. For some applications, execution speed may increase by 10-20% over the conventional configuration of FIG. 1, depending in part on the proportion of graphics calls present in a particular graphics application program.

It should also be noted that in this embodiment, auxiliary thread 602 does not return any information (e.g., error codes or status indications) to application thread 600 after executing a command. Thus, the embodiment of FIG. 6 is advantageously used with application programs that do rely not on error codes or other information returned from the graphics driver; many video games and other commercially available graphics programs fit into this category.

In some embodiments where application thread 600 and auxiliary thread 602 execute asynchronously, it may be desirable to synchronize the two threads from time to time. For example, as is known in the art, if an application program 238 using D3D reads from or writes to graphics memory 224 of FIG. 2, application program 238 first issues a Lock( ) command to prevent the graphics hardware (e.g., any component of graphics subsystem 212) from accessing graphics memory 224 while application program 238 is doing so. When graphics driver program 240 receives a Lock( ) command, it signifies that application program 238 plans to access graphics memory 224. To preserve coherence, graphics driver 240 should ensure that the content of graphics memory 224 is current before allowing application program 238 to make the access.

Conventionally, in response to a Lock( ) command, a graphics driver waits for the push buffer to be drained by the graphics hardware before returning control. In the embodiment shown in FIG. 6, graphics driver 240 also waits until auxiliary thread 602 has finished processing all driver commands previously written to shared memory 606.

To support selective synchronization, the portion of graphics driver program 240 that executes in application thread 600 advantageously determines whether each received command is a "blocking" command, i.e., a command that requires synchronization. When a blocking command is received, application thread 600 writes a synchronization (sync) command to shared memory 606; auxiliary thread 602 executes the sync command by returning a done signal to application thread 600. After writing the sync command, application thread 600 waits for auxiliary thread 602 to return the done signal before proceeding further.

Figure 7A:
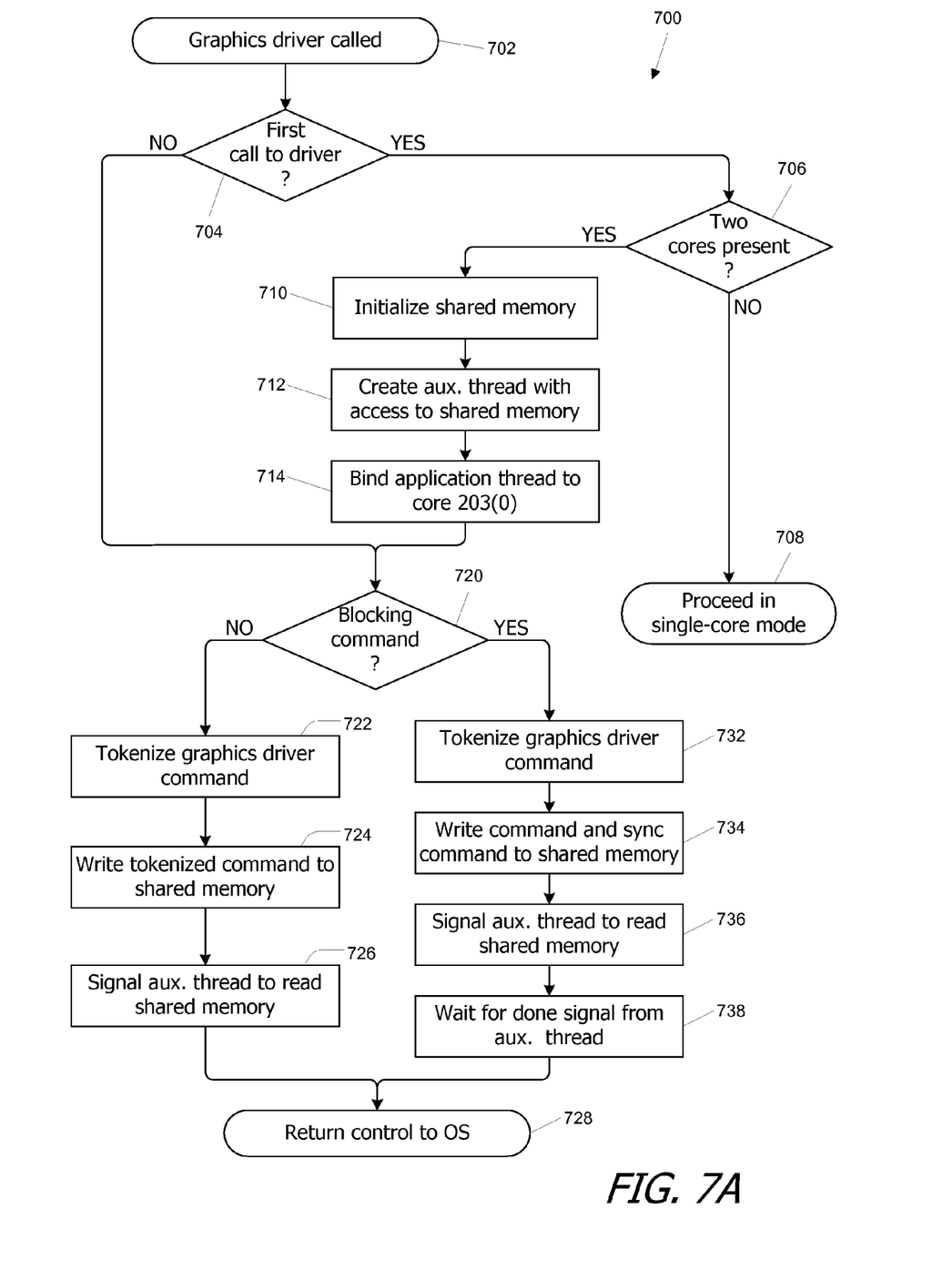
FIGS. 7A and 7B are flow diagrams of a process for executing a graphics command in a kernel-mode graphics driver using two asynchronous threads according to an embodiment of the present invention.
Figure 7B:
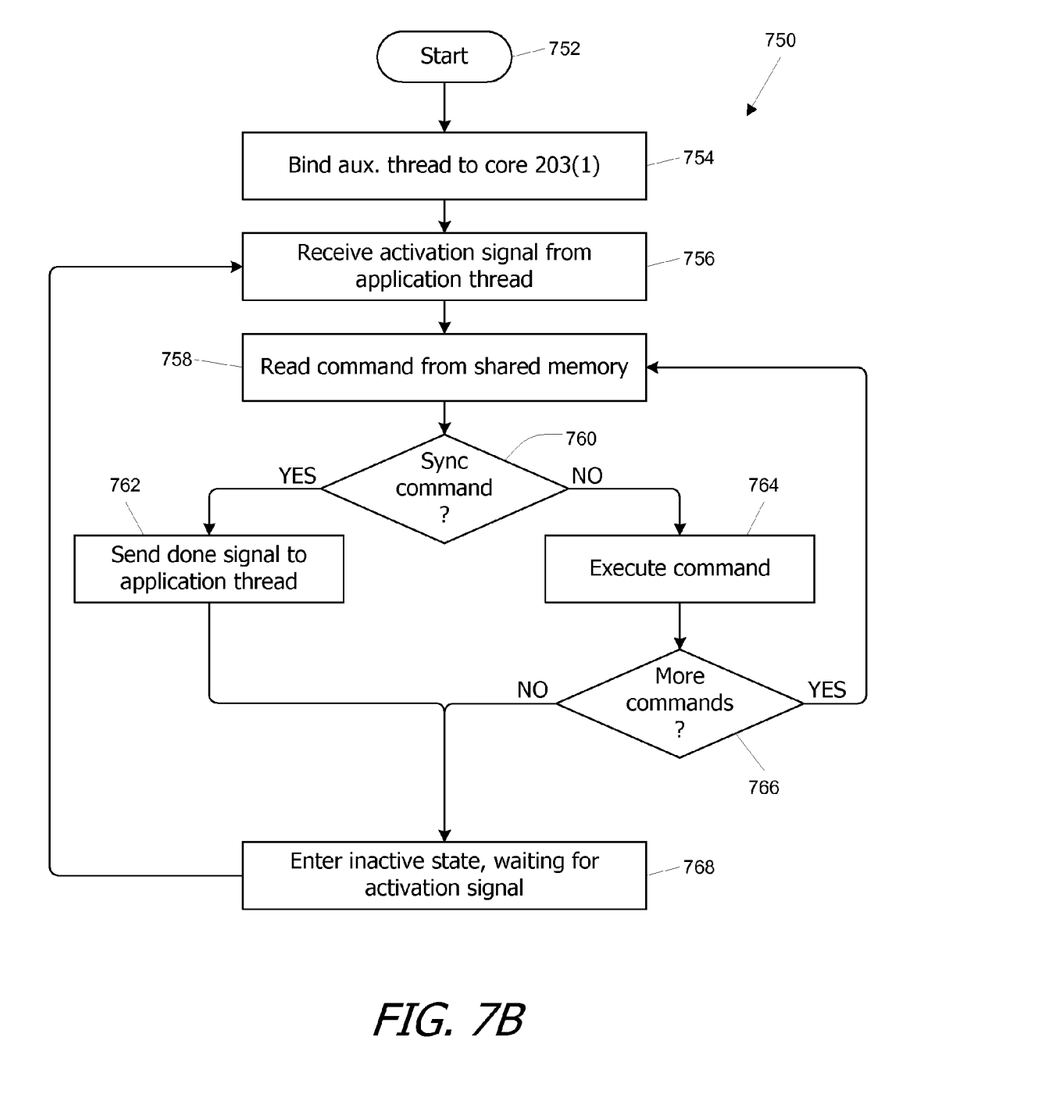

FIGS. 7A and 7B are flow diagrams of a process 700 for executing a graphics command in kernel-mode graphics driver 240 using two asynchronous threads according to an embodiment of the present invention. FIG. 7A shows the process from the perspective of application thread 600 of FIG. 6, while FIG. 7B shows the process from the perspective of auxiliary thread 602 of FIG. 6.

Referring first to FIG. 7A, process 700 starts when application thread 300 calls a function of graphics driver 240 (step 702). It is to be understood that application thread 600 of FIG. 6 may perform any number of operations prior to a call to the graphics driver; such operations may be executed in a conventional manner and are not described further herein. As described above, application program 238 advantageously invokes kernel-mode graphics driver functions via the run-time component of OS 236.

At step 704, graphics driver 240 determines whether the current graphics driver function call is the first such call in application thread 600. If so, then at step 706, graphics driver 240 accesses system configuration information to determine whether CPU 202 has two (or more) cores. If CPU 202 has only one core, then graphics driver 240 proceeds in a single-core mode (step 708), which may be implemented in conventional fashion (e.g., as described above with reference to FIG. 1), ending process 700.

If CPU 202 has two (or more) cores, graphics driver 240 creates an auxiliary thread 702. More specifically, at step 710, graphics driver 240 defines a shared memory area 606 for use in delivering commands to the auxiliary thread; conventional operating-system functions for creating a shared memory area can be used. Shared memory area 606 can be of any desired size and is advantageously large enough to store at least one tokenized graphics driver command. As noted above, shared memory area 606 can be a FIFO or the like capable of storing multiple tokenized commands. At step 712, graphics driver 238 creates the auxiliary thread 602, e.g., using conventional operating-system-defined functions. Auxiliary thread 602 is configured to execute a process 750 described below with reference to FIG. 7B and has access to shared memory area 606.

At step 714, graphics driver 240 binds application thread 600 to core 203(0) of CPU 202, e.g., using an affinity mask as described above. While core 203(0) is used as an example herein, it should be understood that application thread 600 can be bound to any core of CPU 202 (FIG. 2) as long as auxiliary thread 602 is bound to a different core. (Binding of auxiliary thread 602 is described below.)

The remaining steps of process 700 are performed for all calls to graphics driver 240, including the first call. At step 720, it is determined whether the received graphics driver command is a blocking command, e.g., by comparing the received command to a predefined list of blocking commands. In one embodiment, the list of blocking commands includes all graphics driver commands that require synchronizing with any component of graphics subsystem 212.

If the received command is not a blocking command, then the command is executed asynchronously. More specifically, at step 722, graphics driver 240 tokenizes the graphics command. At step 724, the tokenized command is written to shared memory 606, and at step 726, application thread 600 signals auxiliary thread 602 to read shared memory 606, e.g., by setting an operating-system event as described above. At step 728, process 700 returns control to OS 236 without waiting for a done signal or other response from auxiliary thread 602.

If, at step 720, the received graphics command is a blocking command, then the command is executed synchronously. More specifically, at step 732, graphics driver 240 tokenizes the graphics command. At step 734, the tokenized command and a sync command are written to shared memory 606. The sync command may be any command that auxiliary thread 602 responds to by generating a synchronization signal (e.g., setting an event register). At step 736, application thread 600 signals auxiliary thread 602 to read shared memory 606, e.g., by setting an operating-system event as described above. At step 738, graphics driver 240 waits for auxiliary thread 602 to generate the done signal. In one embodiment, the done signal is generated using an operating-system event, as described above. Once the done signal is detected, process 700 returns control to OS 236 (step 728). At that point, process 700 ends, although application thread 600 can continue to execute. At the next call to a graphics driver function, process 700 executes again.

In some embodiments, auxiliary thread 602 executes only those graphics driver commands that require writing instructions to graphics subsystem 212. Other graphics driver commands can be executed from within application thread 600. Accordingly, in some embodiments, process 400 includes an additional decision step (not explicitly shown) at which graphics driver 240 determines whether to forward the received command to auxiliary thread 602. For non-blocking commands, steps 722, 724 and 726 are performed only for commands that are to be forwarded. Other non-blocking commands are executed directly by application thread 600, after which control is returned to OS 236. In some embodiments, some blocking commands do not require that any instructions be sent to graphics subsystem 212. For instance, the Lock( ) command does not entail any action by graphics subsystem 212. Where a blocking command does not require instructions to graphics subsystem 212, step 732 may be skipped, and at step 734, only the sync command is written to shared memory 606.

FIG. 7B illustrates a process 750 that may be executed in auxiliary thread 602 according to an embodiment of the present invention. Process 750 starts (step 752) when application thread 600 creates auxiliary thread 602, e.g., at step 712 of process 700 of FIG. 7A. Auxiliary thread 602 binds itself to core 203(1) at step 754, e.g., by setting an appropriate affinity mask in a Microsoft Windows-based embodiment. While core 203(1) is used as an example herein, it should be understood that auxiliary thread 602 can be bound to any core of CPU 202 (FIG. 2) as long as application thread 600 is bound to a different core.

At step 756, process 750 receives an activation signal from application thread 600. This signal may be generated, e.g., at step 726 or 736 of process 700 of FIG. 7A. After receiving the activation signal, process 750 reads the command from shared memory 606 (step 758). At step 760, process 750 determines whether the command is a sync command. If so, then at step 762, process 750 generates the done signal, e.g., by setting an operating-system event as described above. In some embodiments, process 750 also monitors the push buffer that queues instructions for graphics subsystem 212 and generates the done signal only after graphics subsystem 212 has processed the last command in the push buffer. Thus, the sync command can represent synchronization with graphics subsystem 212 as well as with auxiliary thread 602. After generating the done signal, process 750 enters an inactive state (step 768) to wait for the next activation signal from application thread 600. When the next activation signal is received, process 750 returns to step 756.

If, at step 760, the command is not the sync command, then at step 764, the command is executed. Commands may be executed in a conventional manner, which may include, e.g., writing one or more hardware-level instructions to the push buffer as described above. Once the instructions are written to the push buffer, the command is considered executed, and process 750 proceeds to step 766 to determine whether shared memory 606 has queued any further commands. If so, then process 750 returns to step 758 to read and process the next command. If al commands have been processed, then process 750 enters the inactive state (step 768) to wait for the next activation signal from application thread 600.

In some embodiments, selective synchronization in response to a blocking command is managed using pseudocode fragments similar to those shown in FIGS. 5A and 5B. In one embodiment, application thread 600 waits for the AuxDone event only if the command is a blocking command, and auxiliary thread 602 sets the AuxDone event (e.g., at step 762 of process 750 of FIG. 7B) only when processing a sync command. Application thread 600 can set the AuxWakeUp event after writing each command to shared memory 606 regardless of whether auxiliary thread 602 is active or inactive at that time. Auxiliary thread 602 advantageously clears the AuxWakeUp event and waits for the next AuxWakeUp event each time it returns to the inactive state at step 768 of process 750.

Further Embodiments

While the invention has been described with respect to specific embodiments, one skilled in the art will recognize that numerous modifications are possible. The graphics-driver processes described herein are illustrative and that variations and modifications are possible. For instance, steps described as sequential may be executed in parallel, order of steps may be varied, and steps may be modified or combined. Any or all graphics driver commands may be executed by the auxiliary thread. Embodiments of the invention may be implemented in other operating systems that provide kernel-mode graphics drivers capable of spawning new threads, and the invention is not limited to Microsoft Windows, D3D, or any particular versions thereof. Specific commands, operating system events, and the like mentioned herein are also illustrative and may be modified.

The present invention is applicable to any dual-core CPU system, including systems with two cores in a single CPU chip, systems with two co-operating CPU chips, and so on. The invention may also be practiced in systems with more than two cores, using any two of the cores to execute an application thread and an auxiliary thread.

While the present invention has been described with reference to specific hardware and software components, those skilled in the art will appreciate that different combinations of hardware and/or software components may also be used, and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such media may be packaged with a device to be controlled by the program(s) encoded thereon, or sold separately from any such device. Programs incorporating some or all features of the invention may also be encoded and transmitted using carrier signals adapted for transmission via wired, optical, and/or wireless networks conforming to a variety of protocols, including the Internet.

Thus, although the invention has been described with respect to specific embodiments, it will be appreciated that the invention is intended to cover all modifications and equivalents within the scope of the following claims.

All trademarks used herein are property of their respective owners.

What is claimed is:

1. A method for operating a kernel-mode graphics driver in a central processing unit, the method comprising:
   in a kernel-mode segment of an application thread that executes an application program:
      determining whether the central processing unit has at least two cores; and
      in the event that the central processing unit has at least two cores:
         creating an auxiliary thread for communicating with a graphics processing unit;
         binding the application thread to a first core of the at least two cores;
         receiving a first graphics command originating from the application program; and
         writing the first graphics command to a shared memory accessible to the auxiliary thread;
   in the event that the central processing unit has at least two cores, in the auxiliary thread:
      binding the auxiliary thread to a second core of the at least two cores;
      reading the first graphics command from the shared memory; and
      transmitting a hardware-level instruction corresponding to the first graphics command to the graphics processing unit; and
   in the event that the central processing unit has only one core, operating in a single-core mode.

2. The method of claim 1 wherein the act of writing the first graphics command to the shared memory includes:
   tokenizing the first graphics command; and
   writing the tokenized first graphics command to the shared memory.

3. The method of claim 1 further comprising, in the kernel-mode segment of the application thread:
   after writing the first graphics command to the shared memory, signaling the auxiliary thread to execute the first graphics command.

4. The method of claim 1 further comprising, in the auxiliary thread:
   returning a done signal to the application thread after transmitting the hardware-level instruction to the graphics processing unit.

5. The method of claim 4 further comprising, in the kernel-mode segment of the application thread:
   after writing the first graphics command to the shared memory, waiting for the done signal from the auxiliary thread;
   returning control of the application thread to the application program after receiving the done signal from the auxiliary thread.

6. The method of claim 4 wherein sending the done signal includes setting an operating-system event.

7. The method of claim 1 further comprising, in the kernel-mode segment of the application thread:
   after writing the first graphics command to the shared memory, returning control of the application thread to the application program without waiting for a response from the auxiliary thread.

8. The method of claim 7 further comprising, in the kernel-mode segment of the application thread:
   receiving a second graphics command from the application program, wherein the second graphics command requires synchronization with the graphics processing unit;
   in response to the second graphics command, writing a synchronization command to the shared memory, wherein the auxiliary thread responds to the synchronization command by returning a done signal to the application thread; and
   waiting for the auxiliary thread to return the done signal.

9. The method of claim 8 further comprising, in the kernel-mode segment of the application thread:
   writing the second graphics command to the shared memory such that the auxiliary thread will execute the second graphics command before executing the synchronization command.

10. The method of claim 1 wherein:
   binding the application thread to the first core includes setting an operating-system affinity mask associated with the application thread to a value identifying the first core; and
   binding the auxiliary thread to the second core includes setting an operating-system affinity mask associated with the auxiliary thread to a value identifying the second core.

11. The method of claim 1 further comprising, in the kernel-mode segment of the application thread:
   receiving a second graphics command from the application program, wherein the second graphics command is to be executed without an instruction to the graphics processing unit; and
   executing the second graphics command within the kernel-mode segment of the application thread.

12. The method of claim 11 further comprising, in the kernel-mode segment of the application thread, prior to executing the second graphics command:
   writing a synchronization command to the shared memory, wherein the auxiliary thread responds to the synchronization command by sending a done signal to the application thread; and
   waiting for the auxiliary thread to send the done signal, wherein the second graphics command is executed after the auxiliary thread sends the done signal.

13. A graphics driver for a computer system having a central processor, the graphics driver comprising:
   application interface logic adapted to determine whether the central processor includes at least two cores and to be bound to a first core of the at least two cores in the event that the central processor includes at least two cores, the application interface logic being further adapted to communicate with an application program via an operating system program; and
   auxiliary logic adapted to be bound to the second core of the central processor and further adapted to communicate with a graphics processing unit,
   wherein the application interface logic is further adapted to receive graphics commands originating from an application program, to write the graphics commands to a shared memory in the event that the central processor includes at least two cores, and to operate in a single-core mode in the event that the central processor includes only one core, and
   wherein the auxiliary logic is further adapted to read the graphics commands from the shared memory and to execute the graphics commands by communicating corresponding instructions to the graphics processing unit.

14. The graphics driver of claim 13 wherein the auxiliary logic is further adapted to communicate a done signal to the application interface logic upon completion of executing the graphics commands.

15. The graphics driver of claim 14 wherein the application interface logic is further adapted to wait for the done signal after writing the graphics command to the shared memory.

16. The graphics driver of claim 14 wherein the auxiliary logic is further adapted to communicate the done signal by setting an operating-system event register.

17. The graphics driver of claim 13 wherein:
   the application interface logic is further adapted to determine whether the received graphics command is a blocking command and to write a synchronization command to the shared memory in the event that the received graphics command is a blocking command; and
   the auxiliary logic is further adapted to read the synchronization command from the shared memory and, in response thereto, to communicate a done signal to the application interface logic.

18. A computer program product comprising:
   a non-transitory computer readable medium encoded with program code for communicating between a central processor and a graphics processing unit coupled to the central processor, the program code including:
   program code executable in a kernel-mode segment of an application thread running on the central processor for determining whether the central processing unit has at least two cores and, in the event that the central processing unit has at least two cores:
      creating an auxiliary thread for communicating with the graphics processing unit;
      binding the application thread to the first core of the central processor;
      receiving a first graphics command originating from the application program; and
      writing the first graphics command to a shared memory accessible to the auxiliary thread;
   program code executable in the auxiliary thread in the event that the central processor has at least two cores for:
      binding the auxiliary thread to the second core of the central processor;
      reading the first graphics command from the shared memory; and
      transmitting a hardware-level instruction corresponding to the first graphics command to the graphics processing unit; and
   program code executable in the kernel-mode segment of the application thread for operating in a single-core mode in the event that the central processor has only one core.

19. The computer program product of claim 18 wherein the program code is executable by a central processor running a version of a Microsoft Windows operating system.

20. The computer program product of claim 19 wherein the program code further includes program code for executing a D3D graphics driver function invoked by the operating system.

* * * * *